US012671300B2

(12) United States Patent
Tanaka et al.

(10) Patent No.: US 12,671,300 B2
(45) Date of Patent: Jun. 30, 2026

(54) DEVICE HAVING TUNNEL PORTION AND CATCH TANK PORTION

(71) Applicants: JATCO Ltd, Fuji (JP); NISSAN MOTOR CO., LTD., Yokohama (JP)

(72) Inventors: Yuuki Tanaka, Fuji (JP); Yutaka Okumura, Numazu (JP); Yusuke Suzuki, Iwata (JP); Yojiro Mochizuki, Fujinomiya (JP)

(73) Assignees: JATCO Ltd, Fuji (JP); NISSAN MOTOR CO., LTD., Yokohama (JP)

( * ) Notice: Subject to any disclaimer, the term of this patent is extended or adjusted under 35 U.S.C. 154(b) by 193 days.

(21) Appl. No.: 18/548,386

(22) PCT Filed: Feb. 28, 2022

(86) PCT No.: PCT/JP2022/008240
§ 371 (c)(1),
(2) Date: Aug. 30, 2023

(87) PCT Pub. No.: WO2022/196320
PCT Pub. Date: Sep. 22, 2022

(65) Prior Publication Data

US 2024/0136891 A1    Apr. 25, 2024
US 2024/0235331 A9    Jul. 11, 2024

(30) Foreign Application Priority Data

Mar. 15, 2021    (JP) ................................. 2021-041032

(51) Int. Cl.
*H02K 9/193*      (2006.01)
*F16H 57/02*      (2012.01)
(Continued)

(52) U.S. Cl.
CPC ......... *H02K 9/193* (2013.01); *F16H 57/0423* (2013.01); *F16H 57/0424* (2013.01);
(Continued)

(58) Field of Classification Search
CPC ........ H02K 7/116; H02K 9/193; H02K 5/203; F16H 57/0423; F16H 57/0424; F16H 57/0457; F16H 57/0476; F16N 31/02
See application file for complete search history.

(56) References Cited

U.S. PATENT DOCUMENTS

2007/0151411 A1*   7/2007   Suzuki ................ F16H 57/0494
                                   74/606 R
2011/0214947 A1*   9/2011   Tuomas .............. F16H 57/0423
                                   184/6.12

(Continued)

FOREIGN PATENT DOCUMENTS

DE            223205 A1    6/1985
DE   10 2007 057 984 A1   6/2009

(Continued)

*Primary Examiner* — Oluseye Iwarere
*Assistant Examiner* — Daniel K Schlak
(74) *Attorney, Agent, or Firm* — Foley & Lardner LLP

(57) ABSTRACT

A component comprising: a first case portion having a tunnel portion having an opening end opening toward an axial direction; and a second case portion having a catch tank portion opening upward, wherein the first case portion and the second case portion face each other such that a bottom portion of the tunnel portion and a bottom portion of the catch tank portion are coupled to each other, an opening area of the opening end of the tunnel portion on the second case portion side is larger than an opening area of the opening end of the tunnel portion on a side opposite to the second case portion side, the tunnel portion as a whole is inclined downward from the second case portion side of the tunnel portion to the side opposite to the second case portion side of the tunnel portion, and the second case portion side of the tunnel portion is inclined downward toward the catch tank portion.

8 Claims, 9 Drawing Sheets

(51) Int. Cl.

| | | |
|---|---|---|
| *F16H 57/04* | (2010.01) | |
| *F16N 31/02* | (2006.01) | |
| *H02K 5/20* | (2006.01) | |
| *H02K 7/116* | (2006.01) | |

(52) U.S. Cl.
CPC ....... *F16H 57/045* (2013.01); *F16H 57/0457* (2013.01); *F16H 57/0471* (2013.01); *F16H 57/0476* (2013.01); *F16H 57/0483* (2013.01); *F16N 31/02* (2013.01); *H02K 5/203* (2021.01); *H02K 7/116* (2013.01); *F16H 2057/02034* (2013.01)

(56) References Cited

U.S. PATENT DOCUMENTS

| | | | | |
|---|---|---|---|---|
| 2012/0096968 A1 * | 4/2012 | Kawamoto | ......... | F16H 57/0423 74/467 |
| 2012/0145483 A1 * | 6/2012 | Araki | ................. | F16H 57/0423 184/6.12 |
| 2012/0178571 A1 * | 7/2012 | Yoshimi | ............. | F16H 57/0423 475/6 |
| 2013/0019707 A1 * | 1/2013 | Ebihara | ............... | B60K 7/0007 74/468 |
| 2014/0174856 A1 * | 6/2014 | Takagi | ................ | F16H 57/0436 184/6.12 |

| | | | | |
|---|---|---|---|---|
| 2015/0222162 A1 * | 8/2015 | Pinkley | .................... | H02K 9/19 310/54 |
| 2015/0276041 A1 * | 10/2015 | Tage | ...................... | F16H 57/042 184/6.12 |
| 2016/0186855 A1 * | 6/2016 | Tahara | ................ | F16H 57/0424 74/413 |
| 2018/0163846 A1 * | 6/2018 | Ahn | ........................ | F01M 11/02 |
| 2019/0249765 A1 * | 8/2019 | Ito | ............................ | B60K 1/00 |
| 2021/0054918 A1 * | 2/2021 | Trinh | ................... | F16H 57/0423 |
| 2021/0277989 A1 * | 9/2021 | Martin | ................... | B60K 17/16 |
| 2021/0394600 A1 * | 12/2021 | Absenger | .............. | H02K 7/116 |
| 2022/0042591 A1 | 2/2022 | Yu et al. | | |
| 2022/0282784 A1 * | 9/2022 | Nakata | ................ | F16H 57/0483 |

FOREIGN PATENT DOCUMENTS

| | | | | | | |
|---|---|---|---|---|---|---|
| EP | 1512891 | A2 | * | 3/2005 | ......... | F16H 57/0423 |
| EP | 3026300 | A1 | * | 6/2016 | ......... | F16H 57/0423 |
| FR | 2740853 | A1 | | 5/1997 | | |
| FR | 3052836 | A1 | * | 12/2017 | ......... | F16H 57/0424 |
| JP | 57140965 | A | * | 8/1982 | ............ | F16H 57/04 |
| JP | S6332453 | Y2 | * | 8/1988 | ............ | F16H 57/04 |
| JP | H0914406 | A | * | 1/1997 | ......... | F16H 57/0421 |
| JP | 3073539 | B2 | * | 8/2000 | ......... | F16H 57/0494 |
| JP | 2016118261 | A | * | 6/2016 | ............ | F16H 57/04 |
| JP | 2020034127 | A | * | 3/2020 | .......... | F16H 57/042 |
| WO | WO-2014033940 | A1 | * | 3/2014 | ......... | F16H 57/0443 |
| WO | WO-2020/125514 | A1 | | 6/2020 | | |

* cited by examiner

DEVICE HAVING TUNNEL PORTION AND CATCH TANK PORTION

TECHNICAL FIELD

The present invention relates to a component.

BACKGROUND ART

Patent Document 1 discloses a structure in which oil is supplied from a nozzle to a tunnel portion.

PRIOR ART DOCUMENT

Patent Document

Patent Document 1: French Patent Application Publication No. 2740853

SUMMARY OF INVENTION

However, in the structure described in Patent Document 1, a gap is formed between the nozzle and the tunnel portion, and thus oil easily leaks from the gap.

The present invention has been made in view of such a problem, and an object of the present invention is to reduce an amount of oil leaking from between a catch tank portion and a tunnel portion.

According to one aspect of the present invention, a component comprising: a first case portion having a tunnel portion having an opening end opening toward an axial direction; and a second case portion having a catch tank portion opening upward, wherein the first case portion and the second case portion face each other such that a bottom portion of the tunnel portion and a bottom portion of the catch tank portion are coupled to each other.

According to an aspect of the present invention, the amount of oil leaking from between the catch tank portion and the tunnel portion can be reduced.

DESCRIPTION OF EMBODIMENTS

Figure 1:
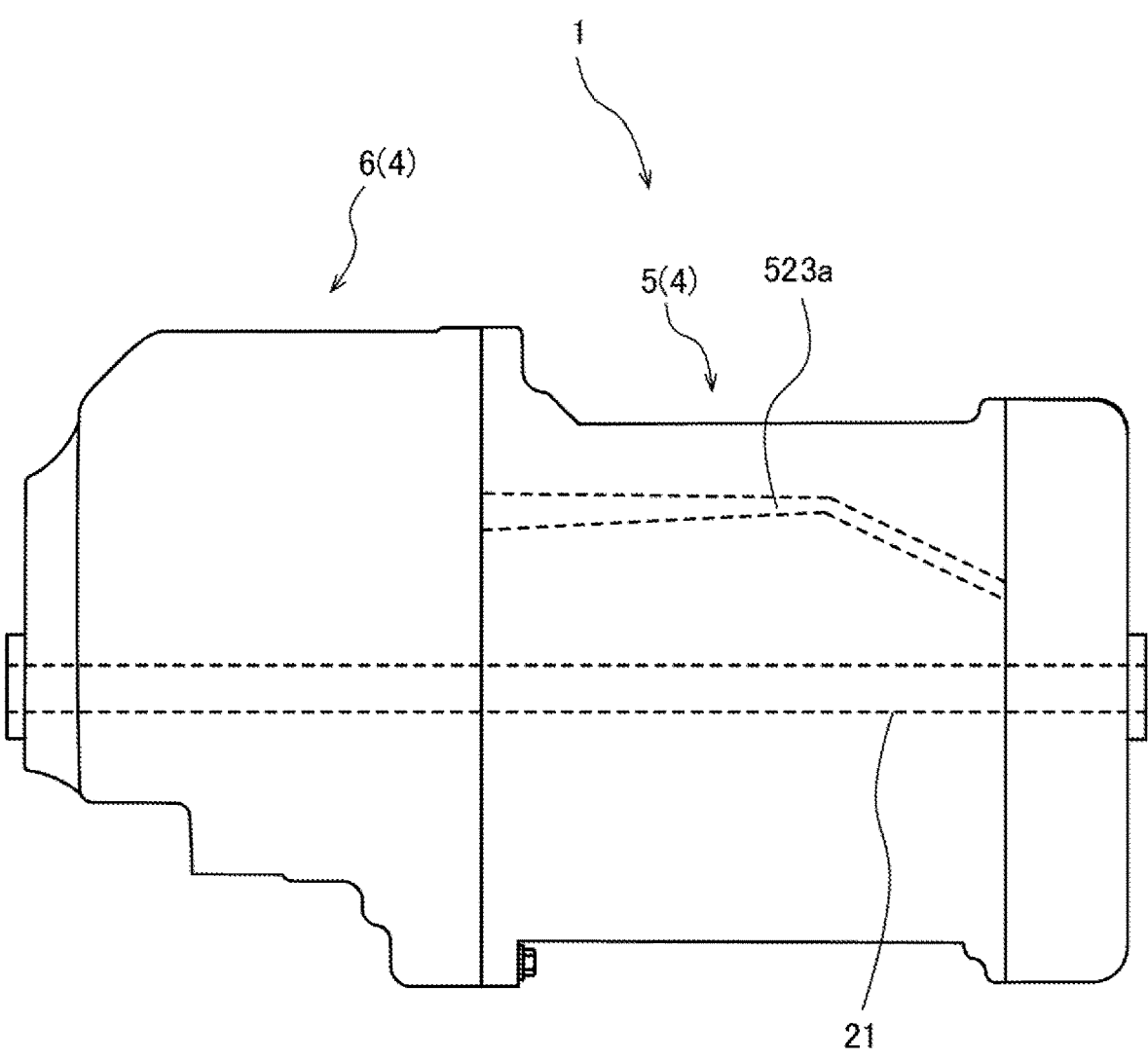
FIG. 1 is a schematic external view showing a power transmission device according to an embodiment.

Hereinafter, an embodiment of the present invention (hereinafter, simply referred to as the present embodiment) will be described with reference to the accompanying drawings.

(Configuration of Power Transmission Device)

First, a power transmission device 1 according to the present embodiment will be described with reference to FIGS. 1 to 3. In the present specification, the same elements are denoted by the same reference numerals throughout the drawings.

FIG. 1 is a schematic external view showing the power transmission device 1 according to the present embodiment. FIG. 2 is a schematic configuration view showing the power transmission device 1. Note that a main part of the power transmission device 1 is shown in cross section. FIG. 3 is a schematic configuration view showing the power transmission device 1.

The power transmission device 1 is used for power transmission to a driving wheel (not shown) of an automobile, but is not limited thereto, and may be used for power transmission to an electric product, for example. As shown in FIGS. 1 to 3, the power transmission device 1 includes a motor 2, a power transmission mechanism 3, and a case member 4. A component may be, for example, the case member 4 alone or a vehicle component including the case member 4, but is not limited thereto. Examples of the vehicle component include a driving device that drives a vehicle, but are not limited thereto.

Figure 3:
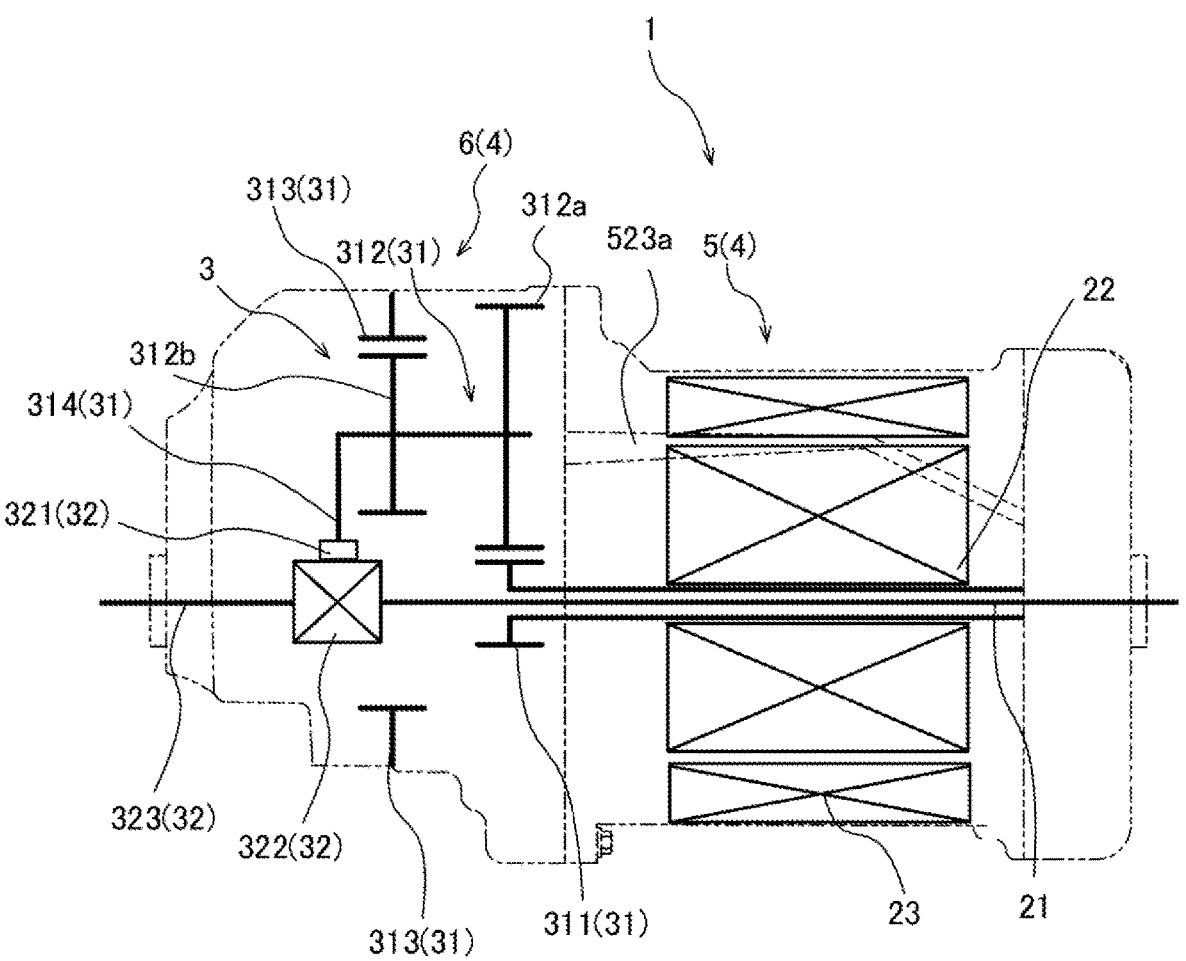
FIG. 3 is a schematic configuration view showing the power transmission device.

As shown in FIG. 3, the motor 2 is a driving source that transmits a driving force (rotational force) to the driving wheel and the power transmission mechanism 3. The motor 2 includes a shaft 21 that extends along a longitudinal direction of the power transmission device 1 and is rotatable, a motor rotor 22 that is provided on an outer peripheral side of the shaft 21, and a motor stator 23 that is provided on an inner peripheral side of an inner cylinder 511 of a third case portion 51 to be described later of the case member 4 to be located on an outer peripheral side of the motor rotor 22. An axial direction of the shaft 21 (hereinafter, also simply referred to as the axial direction) coincides with the longitudinal direction of the power transmission device 1. The shaft 21 is supported by a front end side bearing (not shown) and a rear end side bearing (not shown) provided in a motor case 5 to be described later of the case member 4.

The power transmission mechanism 3 is a power transmission mechanism that transmits a driving force output from the motor 2 to a driving shaft (not shown) of the driving wheel. The power transmission mechanism 3 is arranged along axial directions of the motor 2 and the shaft 21.

As shown in FIG. 3, the power transmission mechanism 3 includes a planetary gear mechanism 31 and a differential mechanism 32. The planetary gear mechanism 31 includes a sun gear 311, a pinion gear 312, a ring gear 313, and a carrier 314. The differential mechanism 32 includes a differential case 321, a differential gear 322, and an output shaft 323. The driving force output from the motor 2 is transmitted to the output shaft 323 via the sun gear 311, the pinion gear 312, the carrier 314, the differential case 321, and the differential gear 322 in this order.

The sun gear 311 is provided on an outer peripheral side at a rear end of the shaft 21 to be rotatable integrally with the shaft 21. The pinion gear 312 includes a large pinion 312*a* that meshes with the sun gear 311, and a small pinion 312*b* that is formed coaxially with the large pinion 321*a* and meshes with the ring gear 313. The ring gear 313 is non-rotatable. The ring gear 313 is formed with, on an inner peripheral side thereof, meshing teeth that mesh with the small pinion 312*b*. The carrier 314 is coupled to a rear end of the small pinion 312*b* separated from the large pinion 312*a*.

The differential case 321 is integrally formed with the carrier 314. The differential gear 322 is supported by the differential case 321 to mesh with both the shaft 21 and the output shaft 323. The output shaft 323 is supported by a second case portion 6 to be described later of the case member 4 via a support bearing (not shown) to extend on the same straight line as the shaft 21.

The case member 4 is a housing member that houses both the motor 2 and the power transmission mechanism 3. Details of the case member 4 will be described later. (Configuration of Case Member)

Next, the case member 4 will be described in detail with reference to FIGS. 1 to 9.

Figure 4:
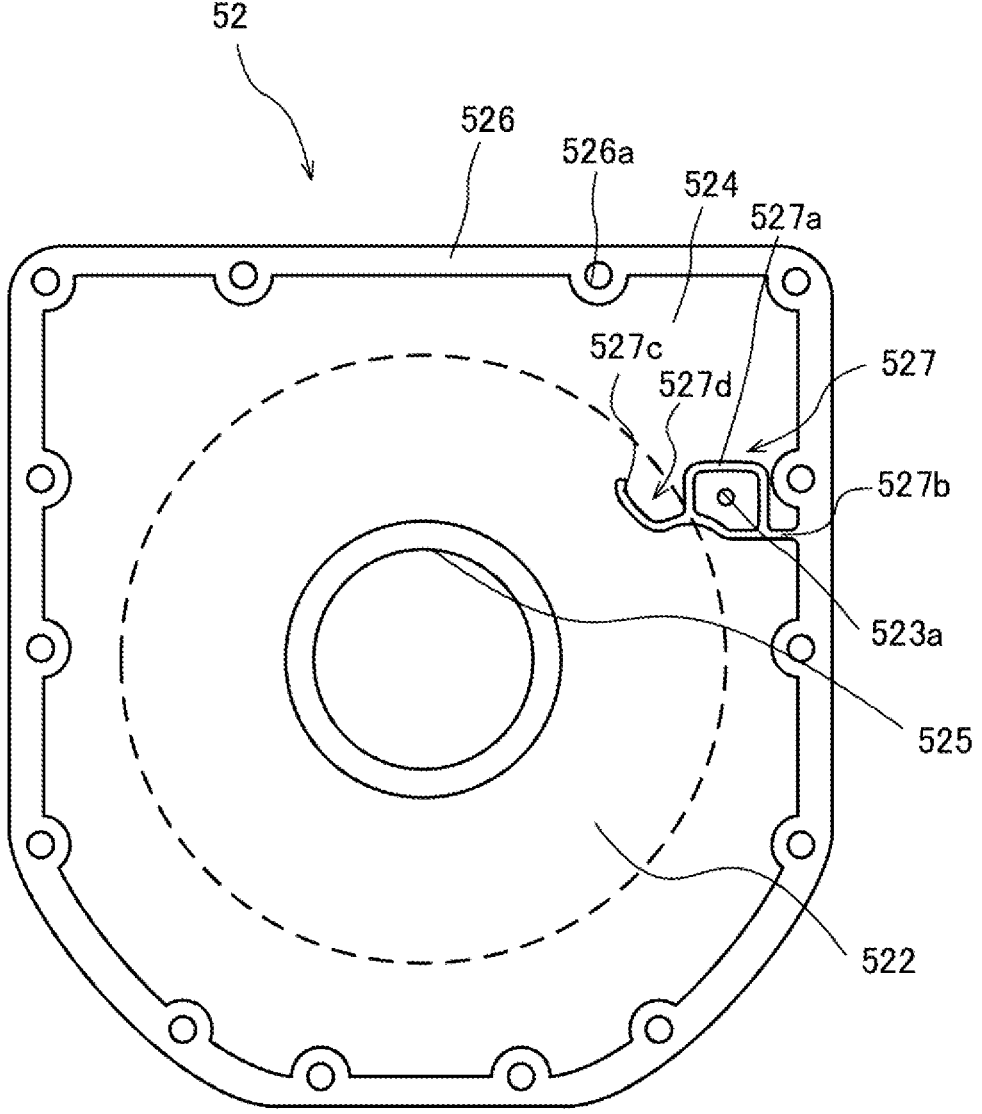
FIG. 4 is a back view showing a first case portion.
Figure 5:
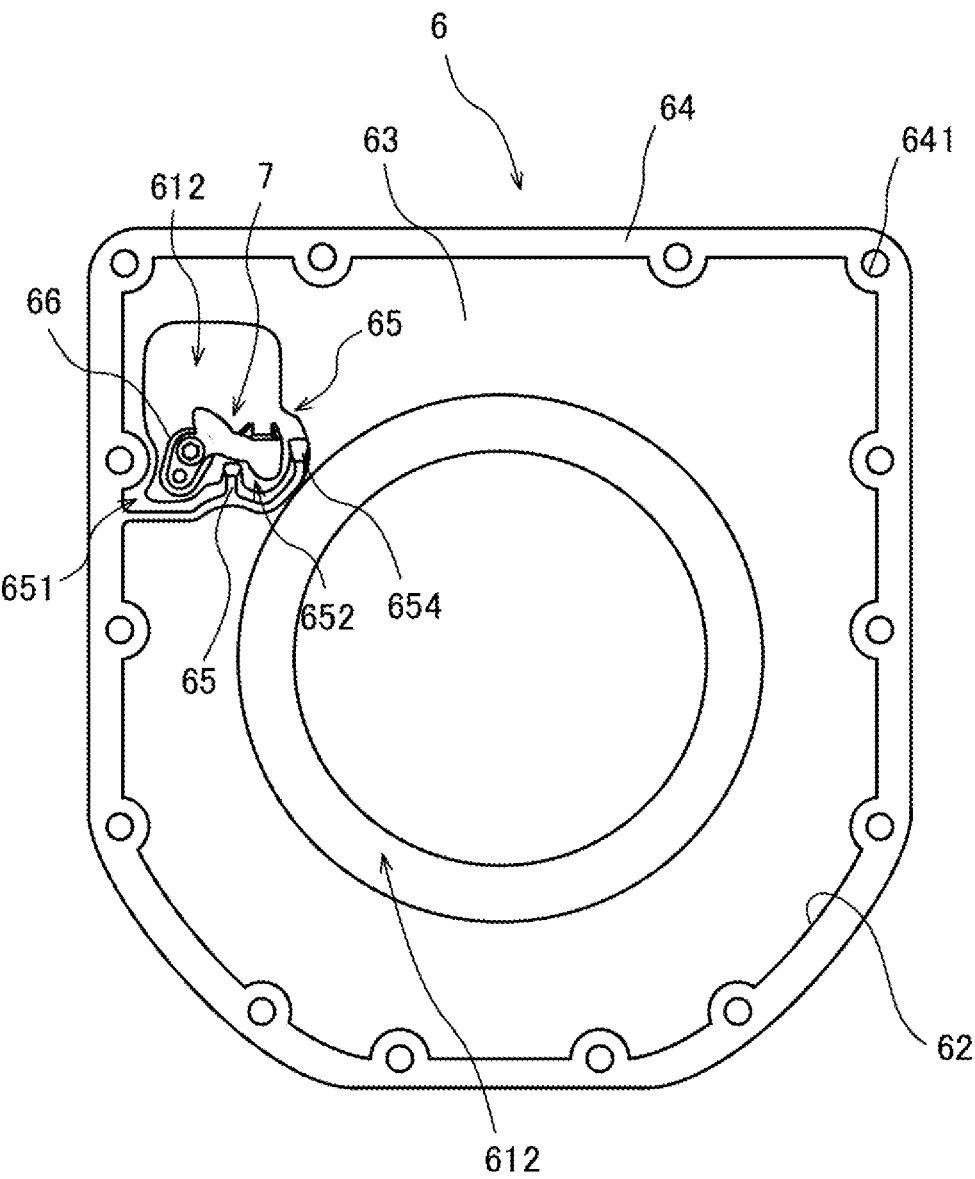
FIG. 5 is a front view showing a second case portion.
Figure 6:
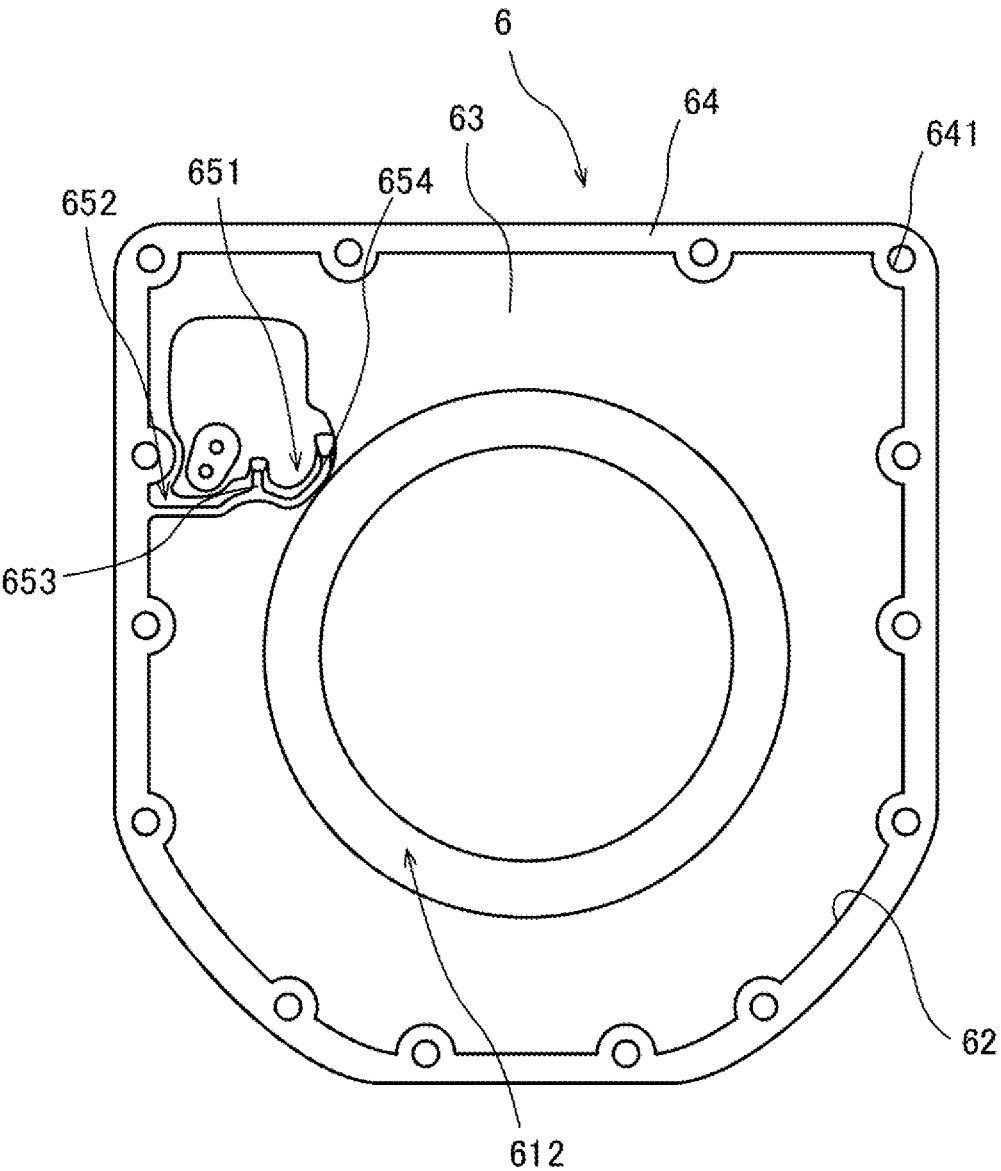
FIG. 6 is a front view showing the second case portion in a state where a guide member is removed.
Figure 7:
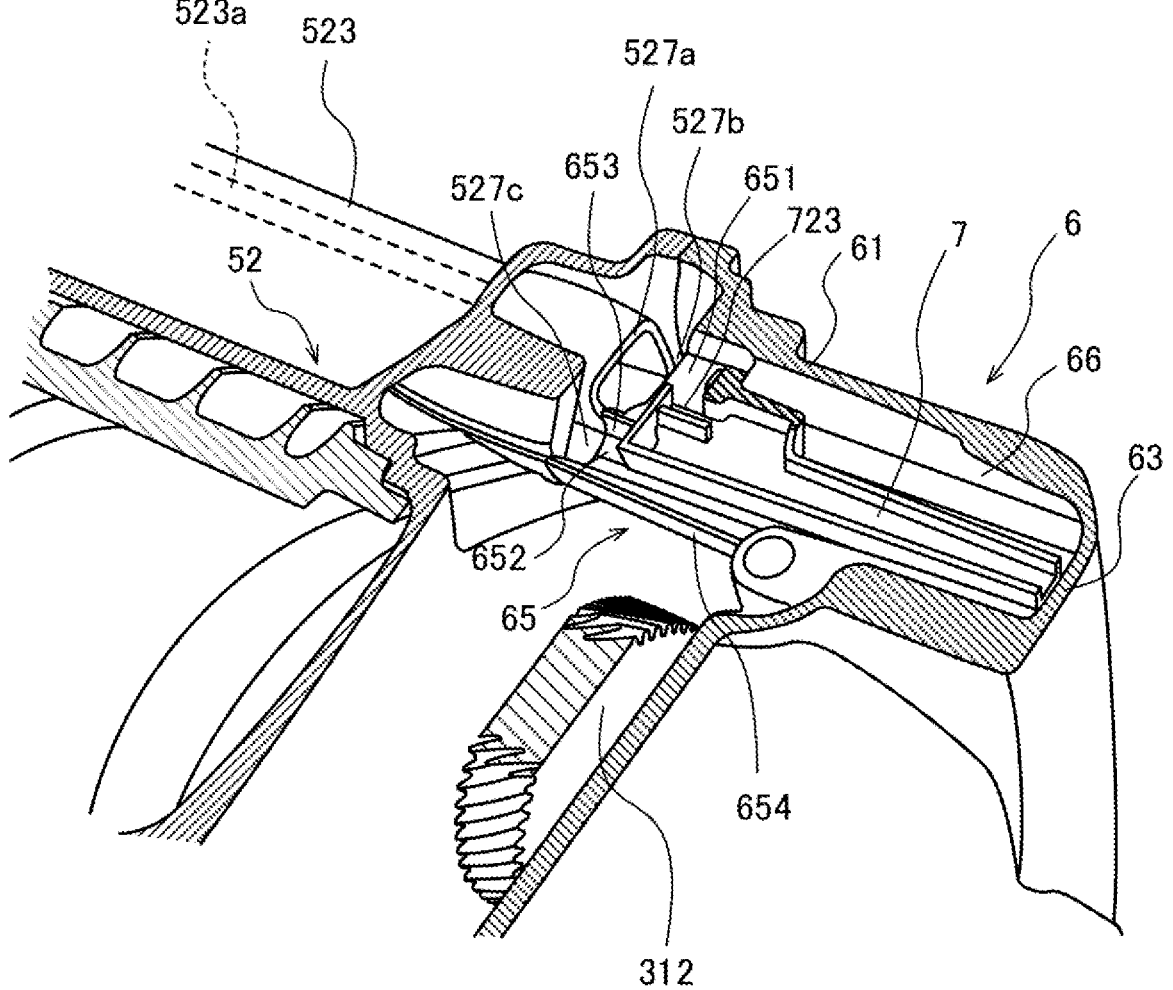
FIG. 7 is a schematic configuration view showing a main part of a case member.
Figure 8:
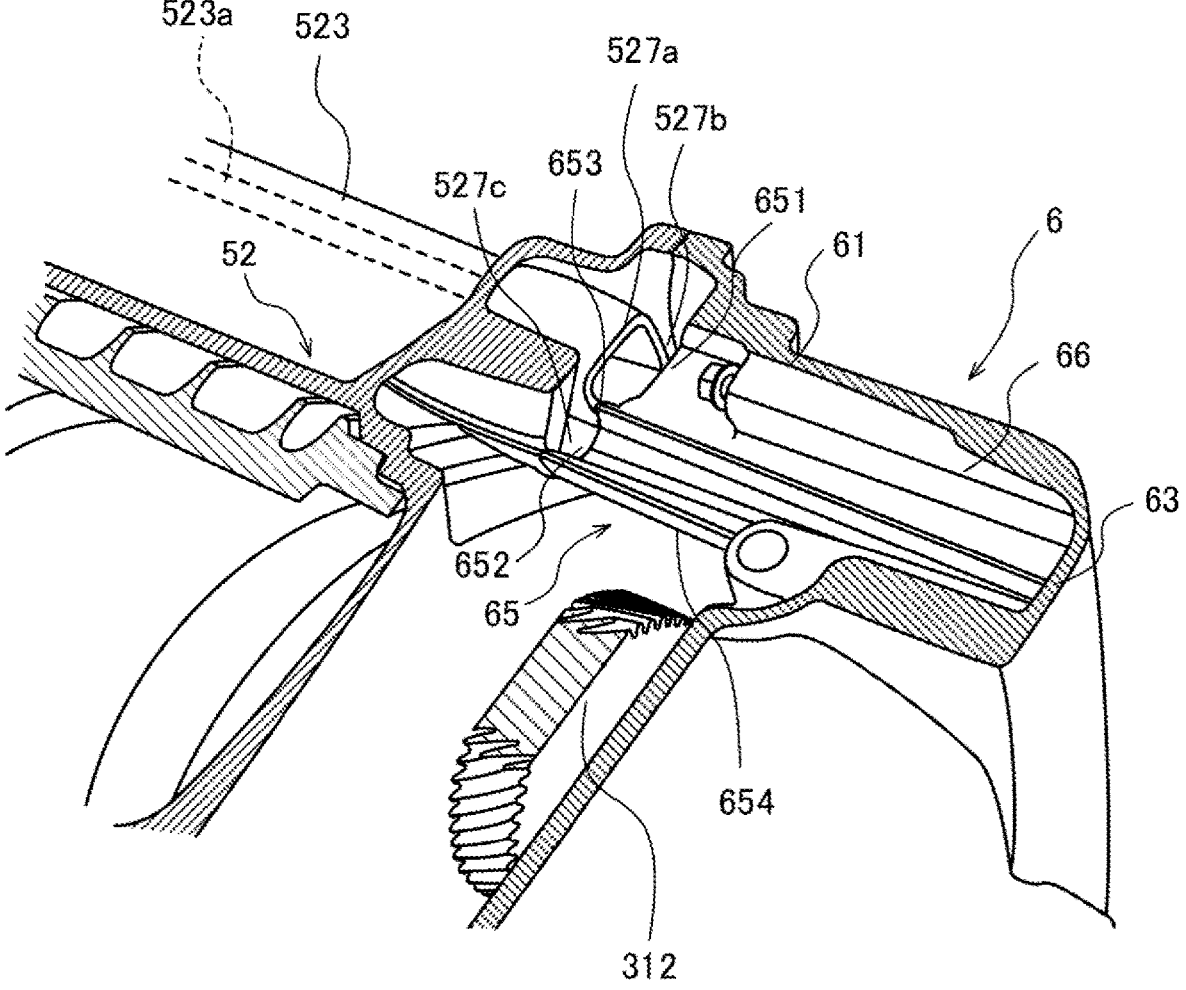
FIG. 8 is a schematic configuration view showing the main part of the case member in a state where the guide member is removed.
Figure 9:
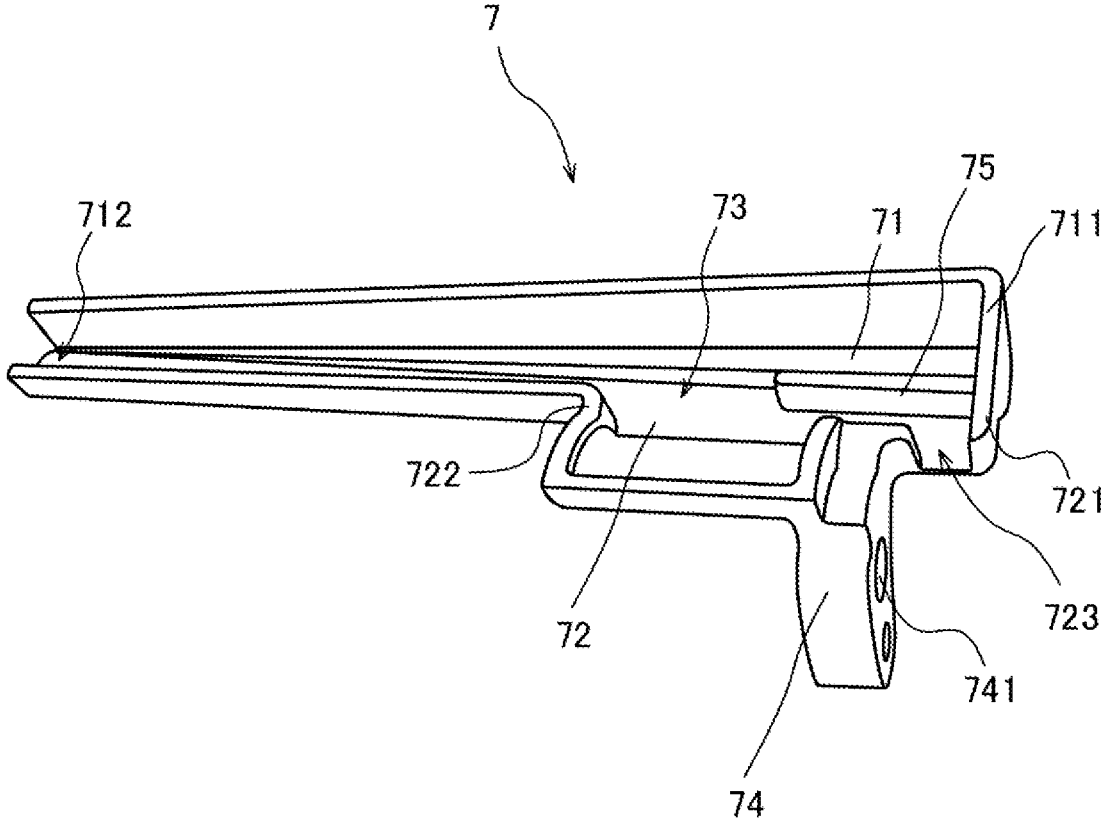
FIG. 9 is a perspective view showing the guide member.

FIG. 4 is a back view showing a first case portion 52. FIG. 5 is a front view showing the second case portion 6. FIG. 6 is a front view showing the second case portion 6 in a state where a guide plate 7 is removed. FIG. 7 is a schematic configuration view showing a main part of the case member 4. FIG. 8 is a schematic configuration view showing the main part of the case member 4 in a state where the guide plate 7 is removed. FIG. 9 is a perspective view showing the guide plate 7. FIGS. 7 and 8 show the main part of the case member 4 in cross section.

As shown in FIGS. 1 to 9, the case member 4 includes the motor case 5 that houses the motor 2 and the second case portion 6 that houses the power transmission mechanism 3. The motor case 5 and the second case portion 6 are arranged along the axial direction of the shaft 21 of the motor 2. The motor case 5 and the second case portion 6 are cast by, for example, a material containing aluminum or magnesium.

The motor case 5 includes the third case portion 51 and the first case portion 52.

The third case portion 51 includes the inner cylinder 511 surrounding the outer peripheral side of the motor 2, a front cover 512 provided at a front end of the inner cylinder 511 to seal the front end of the inner cylinder 511, a front flange 513 provided on an outer peripheral side of the inner cylinder 511, and an outer spiral portion 514 that is a spiral portion provided on the outer peripheral side of the inner cylinder 511. The inner cylinder 511 and the front flange 513 are integrally formed. The front cover 512 is formed separately from the inner cylinder 511 and the front flange 513.

The first case portion 52 includes an outer cylinder 521 surrounding the outer peripheral side of the inner cylinder 511, a circular ring-shaped rear cover 522 provided at a rear end of the outer cylinder 521 to be located on an inner peripheral side of the outer cylinder 521, a tube portion 523 protruding from an outer peripheral side of the outer cylinder 521 to extend along the axial direction of the shaft 21 of the motor 2, and a rear flange 524 provided on an outer peripheral side of the rear cover 522. The outer cylinder 521, the rear cover 522, the tube portion 523, and the rear flange 524 are integrally formed.

The first case portion 52 and the third case portion 51 are coupled by bolt fastening so that the inner cylinder 511 of the third case portion 51 is housed on the inner peripheral side of the outer cylinder 521 of the first case portion 52. In a state where the first case portion 52 and the third case portion 51 are coupled to each other, a front end of the outer cylinder 521 and a rear surface of the front flange 513 abut on each other, and a rear end of the inner cylinder 511 and a front surface of the rear cover 522 abut on each other.

In the state where the first case portion 52 and the third case portion 51 are coupled to each other, the motor 2 is housed on the inner peripheral side of the inner cylinder 511 such that a front end faces the front cover 512 and a rear end faces the rear cover 522.

Further, in the state in which the first case portion 52 and the third case portion 51 are coupled to each other, a spiral cavity (refrigerant cavity) surrounded by an outer peripheral wall of the inner cylinder 511, an inner peripheral wall of the outer cylinder 521, and the outer spiral portion 514 is a refrigerant path 53 serving as a washer jacket that cools the motor 2.

That is, the refrigerant path 53 is formed between the inner cylinder 511 and the outer cylinder 521. The inner cylinder 511 and the outer cylinder 521 constitute an inner peripheral wall of the refrigerant path 53 and an outer peripheral wall of the refrigerant path 53, respectively. For example, the motor 2 surrounded by the refrigerant path 53 can be cooled by flowing cooling water serving as a refrigerant through the refrigerant path 53 when the power transmission device 1 is operated.

In the present embodiment, the spiral portion includes the outer spiral portion 514 provided on the outer peripheral side of the inner cylinder 511, but is not limited thereto, and may include an inner spiral portion provided on the inner peripheral side of the outer cylinder 521, for example.

An opening 525 penetrating the rear cover 522 is formed at the center of the rear cover 522. The shaft 21 penetrates the opening 525.

A tunnel portion 523a is formed on an inner peripheral side of the tube portion 523. The tunnel portion 523a is a case oil passage that allows the power transmission mechanism 3 (specifically, a catch tank portion 65 to be described later) upstream to communicate with a front end side of the motor 2 downstream. That is, a rear end that is one end of the tunnel portion 523a communicates with the catch tank portion 65, and a front end that is the other end of the tunnel portion 523a communicates with a communication case oil passage (not shown) formed on the front end side of the motor 2.

The communication case oil passage allows the front end of the tunnel portion 523a to communicate with the front end side bearing, and supplies oil from the tunnel portion 523a to the front end side bearing. Accordingly, the front end side bearing can be lubricated with the oil.

In the present embodiment, the oil is supplied from the tunnel portion 523a to the front end side bearing via the communication case oil passage, but is not limited thereto, and may be supplied from the tunnel portion 523a to the shaft 21 of the motor 2 via the communication case oil passage, for example. In this case, the shaft 21 can be lubricated with the oil. The oil supplied to the shaft 21 returns to the power transmission mechanism 3 through an outer peripheral surface of the shaft 21.

The tunnel portion 523a is inclined. Specifically, the tunnel portion 523a as a whole is inclined along a vertical direction (upper-lower direction) to descend from a rear end side toward a front end side. Accordingly, the oil can smoothly flow from the catch tank portion 65 to the communication case oil passage.

On the other hand, a rear end of the tunnel portion 523a is inclined so that the oil flows from the first case portion 52 to the second case portion 6 due to a draft angle. In such a case, when there is a gap between the catch tank portion 65 and the tunnel portion 523a, oil supplied from the catch tank portion 65 to the tunnel portion 523a may leak from the gap. In particularly such a case, an aspect of the present invention suitably acts.

Since the tunnel portion 523a is formed on the inner peripheral side of the tube portion 523 located on the outer peripheral side of the outer cylinder 521, the tunnel portion 523a is formed on the outer peripheral side of the outer cylinder 521. Since the spiral refrigerant path 53 is formed between the inner cylinder 511 and the outer cylinder 521, the outer cylinder 521 constitutes the outer peripheral wall of the refrigerant path 53. Accordingly, oil flowing through the tunnel portion 523*a* provided in the outer cylinder 521 can be efficiently cooled by the refrigerant path 53 formed on the inner peripheral side of the outer cylinder 521.

The rear flange 524 is a member that couples the first case portion 52 and the second case portion 6 to face each other. As shown in FIG. 4, the rear flange 524 includes an annular first abutting portion 526 provided over the entire periphery of an outer peripheral edge on a rear side (back surface side) to abut on a second abutting portion 64 to be described later of the second case portion 6, and a protruding portion 527 provided on an inner side of the first abutting portion 526 to protrude to the rear side (second case portion 6 side).

A plurality of first through holes 526*a* for bolt fastening that penetrate the first abutting portion 526 are formed in the first abutting portion 526.

The protruding portion 527 is a member that is continuous with (coupled to) the catch tank portion 65. The protruding portion 527 is provided such that a facing surface at a rear end, which is one end, thereof that faces the second case portion 6 is flush with a facing surface of the first abutting portion 526 that faces the second case portion 6. Accordingly, the protruding portion 527 can be easily provided without managing dimensional accuracy.

The protruding portion 527 includes a rectangular annular portion 527*a* serving as an opening end provided at the rear end of the tunnel portion 523*a*, a linear first protruding portion 527*b* provided on one side (right side in FIG. 4) of the annular portion 527*a* in a back view, and an arc-shaped second protruding portion 527*c* that is a facing portion provided on the other side (left side in FIG. 4) of the annular portion 527*a* in the back view.

A main body of the tunnel portion 523*a* is formed at the center of a region surrounded by the annular portion 527*a*. One end (right side in FIG. 4) of a bottom portion of the rectangular annular portion 527*a* is connected to the first protruding portion 527*b*, and the other end (left side in FIG. 4) is connected to the second protruding portion 527*c*.

In the present embodiment, an opening end of the tunnel portion 523*a* is implemented by the annular portion 527*a* constituting a part of the protruding portion 527, but is not limited thereto, and may be implemented by a groove that opens upward, for example. In this case, a side wall of the groove is higher than the main body of the tunnel portion 523*a*. Accordingly, oil can be supplied from the catch tank portion 65 to the main body of the tunnel portion 523*a*.

The first protruding portion 527*b* is a connecting portion that connects the first abutting portion 526 and the annular portion 527*a*. A groove 527*d* is surrounded by the second protruding portion 527*c* and the other side wall (left side wall in FIG. 4) of the annular portion 527*a* connected to the second protruding portion 527*c*.

Figure 2:
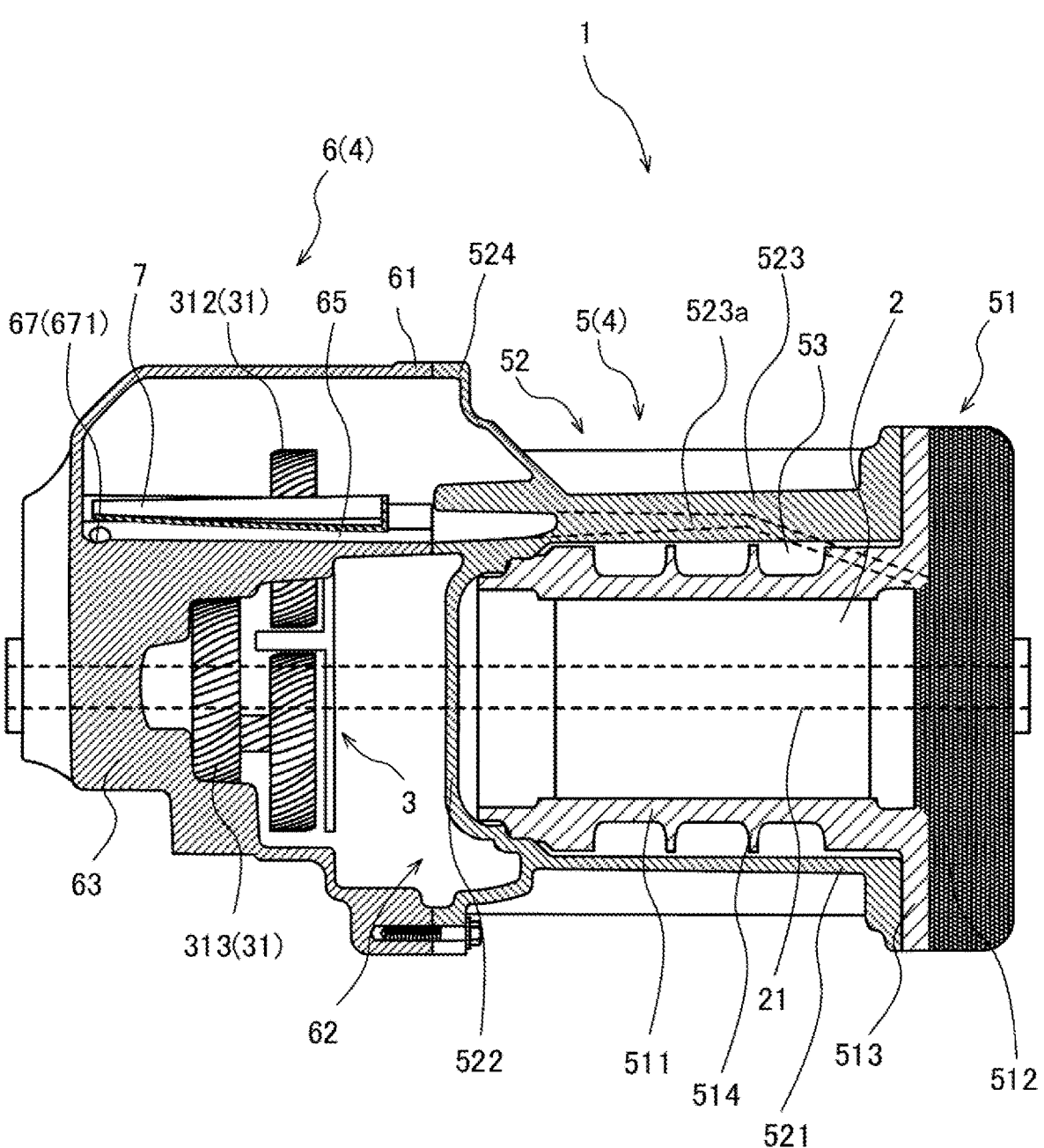
FIG. 2 is a schematic configuration view showing the power transmission device.

As shown in FIGS. 2, 5, and 6, the second case portion 6 is integrally formed to have a bottomed cylindrical shape. The second case portion 6 includes a cylinder portion 61 extending along the axial direction of the shaft 21, an opening 62 formed at a front end that is one end of the cylinder portion 61, a cover portion 63 formed at a rear end that is the other end of the cylinder portion 61, an annular second abutting portion 64 provided at an outer peripheral edge on a front side (front surface side) of the cylinder portion 61, the catch tank portion 65 protruding from the cover portion 63 to extend along the axial direction of the shaft 21, an attachment base 66 protruding from the cover portion 63, and a case oil passage 67 formed in the cylinder portion 61 or the cover portion 63.

The cylinder portion 61 includes a housing region 611 that is located at the center and houses the power transmission mechanism 3, and a catch tank portion housing region 612 that is located on an outer peripheral side of the housing region 611 and is provided with the catch tank portion 65. The power transmission mechanism 3 can be attached to the housing region 611 from the opening 62.

The second abutting portion 64 has a shape corresponding to a shape of the first abutting portion 526 of the rear flange 524. That is, the second abutting portion 64 and the first abutting portion 526 have the same shape and the same dimension. A plurality of second through holes 641 for bolt fastening that penetrate the second abutting portion 64 are formed in the second abutting portion 64. The plurality of second through holes 641 respectively correspond to the plurality of first through holes 526*a*.

Then, in a state where the first abutting portion 526 and the second abutting portion 64 abut against each other, the first case portion 52 and the second case portion 6 are coupled to each other by causing a bolt to penetrate the first through hole 526*a* and the second through hole 641 and tightening the bolt.

The catch tank portion 65 is a tank that catches oil slung up by each gear in the power transmission mechanism 3. The catch tank portion 65 opens upward to easily catch the oil slung up by each gear in the power transmission mechanism 3. In addition, the catch tank portion 65 is provided such that a facing surface at a front end that is one end thereof facing the motor case 5 is flush with a facing surface of the second abutting portion 64 that faces the motor case 5. Accordingly, the catch tank portion 65 can be easily provided without managing dimensional accuracy.

In addition, the catch tank portion 65 is provided in the catch tank portion housing region 612 to extend from the cover portion 63 along the axial direction of the shaft 21 and to be connected to an inner peripheral wall of the cylinder portion 61. Accordingly, dimension of the catch tank portion 65 in the axial direction of the shaft 21 can be maximized, so that a larger amount of oil slung up by each gear in the power transmission mechanism 3 can be caught. In a state in which the first case portion 52 and the second case portion 6 are coupled to face each other, the catch tank portion 65 is continuous with the protruding portion 527 such that the facing surface at the front end thereof abuts on the facing surface at the rear end of the protruding portion 527 over the entirety.

In the present embodiment, the catch tank portion 65 is provided in the catch tank portion housing region 612 to extend from the cover portion 63 along the axial direction of the shaft 21, but is not limited thereto, and may be provided in the catch tank portion housing region 612 to be separated from the cover portion 63 and connected to the inner peripheral wall of the cylinder portion 61.

That is, the catch tank portion 65 is integrally formed with the cylinder portion 61 or the cover portion 63 constituting a part of the second case portion 6. Accordingly, since the catch tank portion 65 can be implemented by the second case portion 6 without being separately provided, the entire configuration of the case member 4 can be simplified, and a step of attaching the catch tank portion 65 to the second case portion 6 can be omitted. In the present embodiment, the catch tank portion 65 is integrally formed with the second case portion 6, but is not limited thereto, and may be formed separately from the second case portion 6, for example.

In the present embodiment, the facing surface at the front end of the catch tank portion 65 partially coincides with the facing surface at the rear end of the protruding portion 527. That is, the facing surface at the front end of the catch tank portion 65 has the same shape and the same dimension as a part of the facing surface at the rear end of the protruding portion 527.

In the present embodiment, the catch tank portion 65 is provided such that the facing surface at the front end thereof is flush with the facing surface of the second abutting portion 64, but is not limited thereto, and may be provided such that the facing surface at the front end thereof is not flush with the facing surface of the second abutting portion 64, for example. In this case, the protruding portion 527 is provided such that the facing surface at the rear end thereof is not flush with the facing surface of the first abutting portion 526.

In the state in which the first case portion 52 and the second case portion 6 are coupled to face each other, the catch tank portion 65 may be continuous with the protruding portion 527 such that the facing surface at the front end thereof abuts on the facing surface at the rear end of the protruding portion 527, and the second abutting portion 64 may be continuous with the first abutting portion 526 such that the facing surface thereof abuts on the facing surface of the first abutting portion 526.

Further, the catch tank portion 65 includes a first groove portion 651 extending along the axial direction of the shaft 21, a second groove portion 652 formed in parallel with the first groove portion 651, a partition wall 653 that partitions the first groove portion 651 and the second groove portion 652, and a side wall 654 as a surrounding wall that faces the partition wall 653 and surrounds the catch tank portion 65.

As shown in FIGS. 5 and 6, in the first groove portion 651, one side (right side in FIGS. 5 and 6) in a front view is connected to the second groove portion 652, and the other side (left side in FIGS. 5 and 6) in the front view is connected to the second abutting portion 64. The partition wall 653 is one side wall (right side wall) of the first groove portion 651. On the other hand, the inner peripheral wall of the cylinder portion 61 is the other side wall (left side wall) of the first groove portion 651. Accordingly, since it is not necessary to separately provide the other side wall of the first groove portion 651, a configuration of the second case portion 6 can be simplified.

The first groove portion 651 is formed such that a front end of a bottom wall (bottom portion) thereof corresponds to a rear end of a combined portion including a bottom wall of the annular portion 527a of the protruding portion 527 (rear end of the tunnel portion 523a) and the first protruding portion 527b. That is, the front end of the bottom wall of the first groove portion 651 has the same shape and the same dimension as the rear end of the combined portion. As shown in FIGS. 7 and 8, in the state where the first case portion 52 and the second case portion 6 are coupled to face each other, the first groove portion 651 is continuous with the annular portion 527a and the first protruding portion 527b such that the facing surface at the front end of the bottom wall thereof abuts on the facing surface at the rear end of the bottom wall of the annular portion 527a and the facing surface at the rear end of the first protruding portion 527b over the entirety.

Accordingly, the amount of oil leaking from between the catch tank portion 65 (specifically, the first groove portion 651) and the tunnel portion 523a can be reduced. As a result, the oil can smoothly flow from the catch tank portion 65 (specifically, the first groove portion 651) to the tunnel portion 523a.

In the present embodiment, the first groove portion 651 is formed such that the facing surface at the front end of the bottom wall thereof is directly continuous with the facing surface at the rear end of the bottom wall of the annular portion 527a and the facing surface at the rear end of the first protruding portion 527b. However, the first groove portion 651 is not limited thereto, and for example, may be formed such that the facing surface at the front end of the bottom wall thereof is indirectly continuous with the facing surface at the rear end of the bottom wall of the annular portion 527a and the facing surface at the rear end of the first protruding portion 527b via a sealing material. In this case, the amount of oil leaking from between the catch tank portion 65 (specifically, the first groove portion 651) and the tunnel portion 523a can be reduced. As a result, the oil can flow more smoothly from the catch tank portion 65 (specifically, the first groove portion 651) to the tunnel portion 523a.

In addition, in the present embodiment, the first groove portion 651 is formed such that the facing surface at the front end of the bottom wall thereof is continuous with both the facing surface at the rear end of the bottom wall of the annular portion 527a and the facing surface at the rear end of the first protruding portion 527b. However, the first groove portion 651 is not limited thereto, and for example, may be formed such that the facing surface at the front end of the bottom wall thereof is continuous only with the facing surface at the rear end of the bottom wall of the annular portion 527a. In this case, the first groove portion 651 is provided with a side wall continuous with a right side wall of the annular portion 527a. Accordingly, the oil can smoothly flow from the catch tank portion 65 (specifically, the first groove portion 651) to the tunnel portion 523a.

Further, in the present embodiment, the first groove portion 651 is continuous with the annular portion 527a such that an upper surface at the front end of the bottom wall thereof is flush with an upper surface at the rear end of the bottom wall of the annular portion 527a, but is not limited thereto, and may be continuous with the annular portion 527a such that the upper surface at the front end of the bottom wall is not flush with the upper surface at the rear end of the bottom wall of the annular portion 527a, for example. That is, a height difference is formed between the upper surface at the front end of the bottom wall of the first groove portion 651 and the upper surface at the rear end of the bottom wall of the annular portion 527a. Even in this case, oil can be supplied from the catch tank portion 65 to the tunnel portion 523a.

As shown in FIGS. 5 to 8, the second groove portion 652 is located closer to the power transmission mechanism 3 than the first groove portion 651. The side wall 654 is one side wall (right side wall) of the second groove portion 652. The partition wall 653 is the other side wall (left side wall) of the second groove portion 652. In this way, the partition wall 653 is the side wall of both the first groove portion 651 and the second groove portion 652. Here, a height of the partition wall 653 is smaller than a height of the side wall 654. Accordingly, when the oil in the second groove portion 652 overflows, the oil in the catch tank portion 65 can be effectively used because the oil flows to the first groove portion 651 side over the partition wall 653 without flowing over the side wall 654.

The second groove portion 652 is formed such that front ends of the bottom wall and the side wall 654 thereof correspond to a rear end of the second protruding portion 527c of the protruding portion 527. That is, the front ends of the bottom wall and the side wall 654 of the second groove portion 652 have the same shape and the same dimension as the rear end of the second protruding portion 527c. As shown in FIGS. 7 and 8, in the state where the first case portion 52 and the second case portion 6 are coupled to face each other, the second groove portion 652 is continuous with the second protruding portion 527c such that facing surfaces at the front ends of the bottom wall and the side wall 654 thereof abut on the facing surface at the rear end of the second protruding portion 527c over the entirety.

Accordingly, an amount of oil leaking from between the second groove portion 652 of the catch tank portion 65 and the second protruding portion 527c can be reduced. As a result, the oil can smoothly flow from the second groove portion 652 to the case oil passage 67. At this time, the second groove portion 652 communicates with the groove 527d surrounded by the second protruding portion 527c and the other side wall of the annular portion 527a connected to the second protruding portion 527c.

In the present embodiment, the second groove portion 652 is formed such that the facing surfaces at the front ends of the bottom wall and the side wall 654 are directly continuous with the facing surface at the rear end of the second protruding portion 527c. However, the second groove portion 652 is not limited thereto, and for example, may be formed such that the facing surfaces at the front ends of the bottom wall and the side wall 654 are indirectly continuous with the facing surface at the rear end of the second protruding portion 527c via a sealing material. In this case, the amount of oil leaking from between the second groove portion 652 of the catch tank portion 65 and the second protruding portion 527c can be further reduced. As a result, the oil can flow more smoothly from the second groove portion 652 to the case oil passage 67.

Further, in the present embodiment, the second groove portion 652 may be continuous with the second protruding portion 527c such that an upper surface at a front end of a bottom wall thereof is flush with an upper surface at a rear end of a bottom wall of the second protruding portion 527c, but is not limited thereto, and may be continuous with the second protruding portion 527c such that the upper surface at the front end of the bottom wall thereof is not flush with the upper surface of the rear end of the bottom wall of the second protruding portion 527c. That is, a height difference is formed between the upper surface at the front end of the bottom wall of the second groove portion 652 and the upper surface at the rear end of the bottom wall of the second protruding portion 527c. Even in this case, the amount of oil leaking from between the second groove portion 652 of the catch tank portion 65 and the second protruding portion 527c can be reduced. As a result, the oil can smoothly flow from the second groove portion 652 to the case oil passage 67.

A case oil passage inlet 671 serving as an inlet of the case oil passage 67 is formed in a rear end of the second groove portion 652 (specifically, a bottom wall of the rear end of the second groove portion 652) (see FIG. 2). That is, the second groove portion 652 of the catch tank portion 65 communicates with the case oil passage 67. Accordingly, oil can be supplied from the second groove portion 652 of the catch tank portion 65 to a plurality of positions other than the tunnel portion 523a. For example, the case oil passage 67 allows the second groove portion 652 to communicate with the support bearing. Accordingly, oil can be supplied from the second groove portion 652 of the catch tank portion 65 to the support bearing, and the support bearing can be lubricated with the oil.

An opening area of the case oil passage inlet 671 of the case oil passage 67 is smaller than an opening area of the annular portion 527a of the tunnel portion 523a. That is, the opening area of the annular portion 527a of the tunnel portion 523a is larger than the opening area of the case oil passage inlet 671 of the case oil passage 67. Therefore, a larger amount of oil can be supplied to the tunnel portion 523a side.

In the present embodiment, the second groove portion 652 is located closer to the power transmission mechanism 3 than the first groove portion 651, but is not limited to this, and may be located closer to the outer side opposite to the power transmission mechanism 3 than the first groove portion 651, for example. In this case, an arrangement relation between the first groove portion 651 and the second groove portion 652 is opposite to an arrangement relation between the first groove portion 651 and the second groove portion 652 in the present embodiment. At this time, an arrangement relation between the annular portion 527a of the protruding portion 527 and the second protruding portion 527c of the protruding portion 527 is also opposite to an arrangement relation between the annular portion 527a and the second protruding portion 527c in the present embodiment.

The partition wall 653 extends along the axial direction of the shaft 21. In the partition wall 653, a front end that is one end is continuous with the other side wall (left side wall in FIGS. 7 and 8) of the annular portion 527a, and a rear end that is the other end is connected to the cover portion 63. The partition wall 653 can reliably partition the first groove portion 651 and the second groove portion 652. As a result, since flow of oil in the first groove portion 651 to the second groove portion 652 side can be reduced, the oil can smoothly flow from the first groove portion 651 to the tunnel portion 523a.

As described above, since the partition wall 653 partitions the first groove portion 651 and the second groove portion 652, the partition wall 653 partitions the annular portion 527a of the tunnel portion 523a communicating with the first groove portion 651 and the case oil passage inlet 671 of the case oil passage 67 communicating with the second groove portion 652.

The height of the partition wall 653 is larger than a height of the main body of the tunnel portion 523a. Accordingly, the oil in the first groove portion 651 can be reliably supplied to the tunnel portion 523a.

In the present embodiment, the partition wall 653 is formed such that a facing surface at a front end thereof is directly continuous with a facing surface at a rear end on the other side wall of the annular portion 527a. However, the partition wall 653 is not limited thereto, and for example, may be formed such that the facing surface at the front end thereof is indirectly continuous with the facing surface of the rear end on the other side wall of the annular portion 527a via a sealing material. In this case, the flow of the oil in the first groove portion 651 to the second groove portion 652 side can be reduced.

As shown in FIGS. 5 to 7, the guide plate 7 serving as a guide member that guides oil into the catch tank portion 65 is housed in the catch tank portion 65. In this way, by providing the guide plate 7 which is a separate body from the catch tank portion 65, it is possible to guide the oil slung up by each gear in the power transmission mechanism 3 into the catch tank portion 65. As a result, efficiency of oil supply can be improved. The guide plate 7 is attached to the attachment base 66 located above the first groove portion 651 of the catch tank portion 65 by bolt fastening.

The guide plate 7 is integrally formed. As shown in FIG. 9, the guide plate 7 includes a first guide groove portion 71 extending along the axial direction of the shaft 21 in a state where the guide plate 7 is attached to the attachment base 66, a second guide groove portion 72 provided in parallel with the first guide groove portion 71, a communication port 73 that allows the first guide groove portion 71 to communicate with the second guide groove portion 72, and an attachment portion 74 provided in the second guide groove portion 72 to be attached to the attachment base 66 by bolt fastening.

The first guide groove portion 71 is a groove that guides the caught oil into both the second guide groove portion 72 and the second groove portion 652 of the catch tank portion 65. As shown in FIGS. 5 and 7, in the state where the guide plate 7 is attached to the attachment base 66, the first guide groove portion 71 is located above the second groove portion 652.

A first end wall 711 that seals a front end of the first guide groove portion 71 is provided at the front end that is one end of the first guide groove portion 71. A first guide opening 712 that guides oil to the second groove portion 652 is formed at a rear end of the other end of the first guide groove portion 71. A gap is formed between the rear end of the first guide groove portion 71 and the cover portion 63.

Therefore, oil can be supplied to the second groove portion 652 from the first guide opening 712 of the first guide groove portion 71, which is closer to the case oil passage inlet 671 of the case oil passage 67 than the front end of the first guide groove portion 71, via the gap, without being supplied to the second groove portion 652 from the front end of the first guide groove portion 71. As a result, the oil can be efficiently supplied from the first guide groove portion 71 to the case oil passage 67.

The first guide groove portion 71 is preferably inclined along the vertical direction (upper-lower direction) to descend from the front end side to the rear end side. Accordingly, the oil can be more efficiently supplied from the first guide groove portion 71 to the case oil passage 67.

The second guide groove portion 72 is a groove that guides the oil to the first groove portion 651 of the catch tank portion 65. As shown in FIGS. 5 to 7, in the state where the guide plate 7 is attached to the attachment base 66, the second guide groove portion 72 is located above the first groove portion 651.

A second end wall 721 that seals a front end of the second guide groove portion 72 and a third end wall 722 that seals a rear end of the second guide groove portion 72 are respectively provided at the front end and the rear end of the second guide groove portion 72. A second guide opening 723 that guides oil into the first groove portion 651 is formed at the front end of the side wall of the second guide groove portion 72 opposite to the first guide groove portion 71.

Therefore, the oil can be supplied to the first groove portion 651 from the second guide opening 723 formed at the front end of the side wall of the second guide groove portion 72, which is closer to the annular portion 527a of the tunnel portion 523a than the rear end of the second guide groove portion 72, without being supplied to the first groove portion 651 from the rear end of the second guide groove portion 72. As a result, the oil can be efficiently supplied from the second guide groove portion 72 to the tunnel portion 523a.

An opening area of the second guide opening 723 is larger than an opening area of the first guide opening 712. Therefore, a large amount of oil can be supplied to the first groove portion 651 than to the second groove portion 652.

The second guide groove portion 72 is preferably inclined along the vertical direction (upper-lower direction) to descend from the rear end side to the front end side.

Accordingly, the oil can be more efficiently supplied from the second guide groove portion 72 to the tunnel portion 523a.

A partition side wall 75 that partitions the first guide groove portion 71 and the second guide groove portion 72 is formed between the first guide groove portion 71 and the second guide groove portion 72. The communication port 73 located near the front end of the first guide groove portion 71 is formed on the partition side wall 75. That is, the communication port 73 is located upstream of the first guide opening 712. Accordingly, the oil in the first guide groove portion 71 can be supplied to the second guide groove portion 72 side before being supplied to the second groove portion 652. As a result, the oil in the first guide groove portion 71 can be quickly supplied to the first groove portion 651 side.

An opening area of the communication port 73 is larger than the opening area of the first guide opening 712. Therefore, a large amount of oil in the first guide groove portion 71 can be supplied to the second guide groove portion 72. As a result, a large amount of the oil can be supplied to the first groove portion 651 than to the second groove portion 652.

An attachment hole 741 for bolt fastening is formed in the attachment portion 74.

By providing the guide plate 7 as in the present embodiment, oil can be guided to the first groove portion 651 that is less likely to catch the oil than the second groove portion 652, and thus the oil can flow more smoothly from the first groove portion 651 to the tunnel portion 523a.

In the present embodiment, the catch tank portion 65 is provided in combination with the guide plate 7 that is a separate body from the catch tank portion 65. However, the catch tank portion 65 is not limited thereto, and for example, may be provided as a single body without providing the guide plate 7. In this case, the number of components constituting the case member 4 can be reduced.

(Functions and Effects)

Next, a main function and effect of the present embodiment will be described.

(1) The case member 4 (component) according to the present embodiment includes the first case portion 52 having the tunnel portion 523a having the annular portion 527a (opening end) opening toward the axial direction, and the second case portion 6 having the catch tank portion 65 opening upward, and the first case portion 52 and the second case portion 6 face each other such that a bottom wall (bottom portion) of the tunnel portion 523a and a bottom wall (bottom portion) of the catch tank portion 65 are coupled to each other.

According to this configuration, the amount of oil leaking from between the catch tank portion 65 and the tunnel portion 523a can be reduced. As a result, the oil can smoothly flow from the catch tank portion 65 to the tunnel portion 523a.

(2) The first case portion 52 is the outer peripheral wall of the refrigerant path 53 (refrigerant cavity).

According to this configuration, the oil flowing through the tunnel portion 523a provided in the first case portion 52 can be efficiently cooled by the refrigerant path 53 formed on the inner peripheral side of the outer cylinder 521 of the first case portion 52.

(3) The catch tank portion 65 communicates with the case oil passage 67 provided in the second case portion 6.

According to this configuration, oil can be supplied from the catch tank portion 65 to a plurality of positions other than the tunnel portion 523a.

(4) The opening area of the case oil passage inlet 671 (inlet) of the case oil passage is smaller than the opening area of the annular portion 527*a* (opening end) of the tunnel portion 523*a*.

According to this configuration, a larger amount of oil can be supplied to the tunnel portion 523*a* side. In particular, when the tunnel portion 523*a* is provided in the outer cylinder 521 of the first case portion 52 and the outer cylinder 521 is the outer peripheral wall of the refrigerant path 53, the oil can be supplied to a position that is easily cooled. As a result, cooling efficiency of the oil can be improved.

(5) The catch tank portion 65 is provided with the partition wall 653 that partitions the case oil passage inlet 671 (inlet) of the case oil passage 67 and the annular portion 527*a* (opening end) of the tunnel portion 523*a*, and the height of the partition wall 653 is smaller than the height of the side wall 654 (surrounding wall) surrounding the catch tank portion 65.

According to this configuration, when the oil in the second groove portion 652 of the catch tank portion 65 communicating with the case oil passage inlet 671 (inlet) overflows, the oil in the catch tank portion 65 can be effectively used because the oil flows to the first groove portion 651 side of the catch tank portion 65 communicating with the annular portion 527*a* (opening end) of the tunnel portion 523*a* over the partition wall 653 without flowing over the side wall 654.

(6) The catch tank portion 65 is partitioned by the partition wall 653 into the first groove portion 651 communicating with the annular portion 527*a* (opening end) of the tunnel portion 523*a* and the second groove portion 652 communicating with the case oil passage inlet 671 (inlet) of the case oil passage 67, the first case portion 52 is provided with the second protruding portion 527*c* (facing portion) facing the second groove portion 652 of the catch tank portion 65, and a front end (one end) of the second groove portion 652 and the second protruding portion 527*c* (facing portion) are coupled to each other.

According to this configuration, the amount of oil leaking from between the second groove portion 652 of the catch tank portion 65 and the second protruding portion 527*c* can be reduced. As a result, the oil can smoothly flow from the second groove portion 652 to the case oil passage 67.

(7) The case member 4 (component) further includes the guide plate 7 (guide member) that is housed in the catch tank portion 65 and guides the oil into the catch tank portion 65.

According to this configuration, by providing the guide plate 7 which is a separate body from the catch tank portion 65, it is possible to guide the oil slung up by each gear in the power transmission mechanism 3 into the catch tank portion 65. As a result, the efficiency of oil supply can be improved.

Although the embodiment of the present invention has been described above, the above embodiment merely exemplifies some of application examples of the present invention and does not intend to limit the technical scope of the present invention to the specific configurations of the above embodiment.

DESCRIPTION OF REFERENCE SIGNS

1 power transmission device
2 motor
3 power transmission mechanism
4 case member (component)

5 motor case
6 second case portion (second case portion)
7 guide plate (guide member)
51 third case portion
52 first case portion
53 refrigerant path (cavity)
65 catch tank portion
67 case oil passage
511 inner cylinder
521 outer cylinder
523*a* tunnel portion
527*a* annular portion (opening end)
527*c* second protruding portion (facing portion)
651 first groove portion
652 second groove portion
653 partition wall
654 side wall
671 case oil passage inlet (inlet)

The present application claims a priority of Japanese Patent Application No. 2021-041032 filed with the Japan Patent Office on Mar. 15, 2021, all the contents of which are hereby incorporated by reference.

The invention claimed is:

1. A component device comprising:
a first case portion having a tunnel portion; and
a second case portion having a catch tank portion which is independent from the tunnel portion and which opens upward, wherein
the first case portion and the second case portion face each other such that a bottom portion of the tunnel portion in the first case portion and a bottom portion of the catch tank portion in the second case portion are coupled to each other,
a first opening at a first end of the tunnel portion on a second case portion side is larger than a second opening at a second end of the tunnel portion on a side opposite to the second case portion side,
the tunnel portion is higher at the second case portion side than at the side opposite to the second case portion side, and
a part of the tunnel portion on the second case portion side is inclined downward toward the catch tank portion.

2. The device according to claim 1, wherein
the first case portion is an outer peripheral wall of a refrigerant cavity.

3. The device according to claim 1, wherein
the catch tank portion communicates with a case oil passage provided in the second case portion.

4. The device according to claim 3, wherein
an opening area of an inlet of the case oil passage is smaller than the first opening at the first end of the tunnel portion on the second case portion side.

5. The device according to claim 3, wherein
the catch tank portion is provided with a partition wall that partitions an inlet of the case oil passage and the first opening at the first end of the tunnel portion on the second case portion side, and
a height of the partition wall is smaller than a height of a surrounding wall that surrounds the catch tank portion.

6. The device according to claim 5, wherein
the catch tank portion is partitioned by the partition wall into a first groove portion communicating with the first opening at the first end of the tunnel portion on the second case portion side and a second groove portion communicating with the inlet of the case oil passage, the first case portion is provided with a facing portion facing the second groove portion of the catch tank portion, and one end of the second groove portion and the facing portion are coupled to each other.

7. The device according to claim 1, further comprising:

a guide member housed in the catch tank portion and configured to guide oil into the catch tank portion.

8. The device according to claim 1, wherein the tunnel portion and the catch tank portion are coupled to each other only at the respective bottom portions.

\*   \*   \*   \*   \*